United States Patent
Harclerode

(10) Patent No.: US 6,698,934 B2
(45) Date of Patent: Mar. 2, 2004

(54) AGITATOR DRIVE

(75) Inventor: Mike L. Harclerode, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 10/134,407

(22) Filed: Apr. 29, 2002

(65) Prior Publication Data

US 2003/0202724 A1 Oct. 30, 2003

(51) Int. Cl.[7] .............................. F16C 33/10; F16C 33/66
(52) U.S. Cl. ........................ 384/462; 384/322; 384/415; 384/473; 184/84
(58) Field of Search ................................. 384/322, 400, 384/415, 462, 486, 473, 474, 475; 184/6.16, 6.17, 6.18, 84

(56) References Cited

U.S. PATENT DOCUMENTS

| | | | |
|---|---|---|---|
| 3,075,690 A | * | 1/1963 | Luenberger |
| 4,037,890 A | * | 7/1977 | Kurita et al. |
| 4,416,555 A | * | 11/1983 | Tomioka et al. ............ 384/415 |
| 4,455,099 A | * | 6/1984 | Shibasaki .................... 384/316 |
| 6,267,204 B1 | * | 7/2001 | Kristensen et al. ......... 184/6.16 |

OTHER PUBLICATIONS

"Lubrication, Shaft–Sealing, and Control–Oil Systems for Special–Purpose Applications"; API Standard 614 Third Edition, Aug. 1992, pp. 41–54.
Rineer Hydraulics, Inc., Product line information, www.rineer.com/webpages–2K1/Product–2K1.html, printed Mar. 11, 2002.

* cited by examiner

Primary Examiner—Thomas R. Hannon

(57) ABSTRACT

A drive for powering an agitator in a chemical process vessel may be located inside a housing attached to the vessel and may have a motor that drives a shaft that is attached to an agitator assembly inside the vessel. The shaft may pass into the vessel through a floor in the housing, which may be provided with a standpipe to prevent the flow of fluid on the floor into the vessel. A shield attached to the shaft may be provided above the standpipe to prevent fluid from entering the standpipe from above. In addition, a sump may be provided to allow effective lubrication and cooling for bearings that support the shaft.

31 Claims, 4 Drawing Sheets

AGITATOR DRIVE

TECHNICAL FIELD

This application pertains to a drive for a rotary agitator. In particular, the drive provides for agitation of chemicals in high-temperature, high-pressure environments without the need for a seal around the drive shaft, and allows for the use of conventional bearings to support the shaft.

BACKGROUND

Industrial chemical processes often occur in reactor vessels and require agitation to aid chemical reactions. For example, agitation may provide for homogenous mixing, or for uniform suspension of materials having different densities or phases such as emulsions or solids suspended in a liquid. In general, agitators typically include one or more propellers or impellers inside the vessel that are attached to a rotating shaft. The shaft extends out through the wall of the vessel to a motor that rotates the shaft and, in turn, rotates the impellers or propellers. One or more bearing assemblies, generally near the vessel wall, hold the shaft in place and allow it to rotate freely and steadily under various rotational, transverse, and thrust loads.

It is desirable that an agitator provide consistent performance with few failures. Major industrial processing plants are extremely complex and very expensive to operate. A breakdown at one vessel can stop the operation of a major portion of a plant, and disassembly (and reassembly) of an agitator drive for repairs often takes a long time and can destroy the batch being processed in the vessel. Even worse, a breakdown in the middle of a batch may require that the vessel be carefully and laboriously cleaned before processing may resume.

Where the conditions inside the vessel are severe, such as where the temperature and pressure inside the vessel are both very high, a conventional agitator drive system may not provide acceptable reliability. For example, the motor for a drive system is typically located in a low-pressure area, and the drive shaft passes from the motor into the vessel so that there generally must be seals, packing, and/or bearings at the point where the shaft passes through the wall of the vessel. Seals and packing are prone to quick degradation under severe conditions where they are placed in high temperatures or across high-pressure differentials. In addition, the seals, packing, or bearings must be properly lubricated, and under severe conditions, the lubricants may degrade or may even leak into the interior of the vessel, contaminating the process.

Conventional solutions may not be adequate to address such problems caused by severe conditions. For example, pusher mechanical seals are often used at the vessel wall between areas of high and low pressure. These seals generally rely, however, on elastomers, which are inappropriate materials for high-temperature applications. Metal bellows (or non-pusher) seals are often used where high temperatures are expected, but they do not generally work well under high pressures. Packing materials may also be provided around a shaft where it enters a vessel. While such a solution again works well under high pressure, it can cause problems where temperatures are elevated. For example, high clamping forces around the packing material help form a tight seal that can withstand high pressure, but the forces also create friction that produces additional heat. When combined with high temperatures in the vessel, this friction can cause rapid destruction of the materials.

Placing the drive system—motor and all—entirely inside the vessel solves the problem of sealing across a high-pressure differential, but it is not generally acceptable. The drive motor will likely be less amenable to severe conditions than are the bearings that support the shaft because it contains bearings and other components that may not handle high temperatures or a corrosive environment well. And placing the entire drive system in the vessel simply places the bearings entirely inside the high-temperature, and potentially corrosive, conditions. In addition, access to the drive is more difficult when it is entirely inside the vessel. Moreover, the problem of potential contamination of the vessel may be worsened, particularly where the motor is hydraulically powered.

One solution to the problem is to break the shaft in two, placing the motor and part of the shaft outside the vessel, and the other part of the shaft inside the vessel, so that no portion of the drive passes through the vessel wall. The two parts of the shaft may be coupled through the vessel wall magnetically. The motor's shaft outside the vessel may be attached to large magnets, and the drive shaft attached to the agitator inside the vessel may be attached to matching magnets. The sets of magnets may be positioned on each side of a protruding area of the vessel wall so that rotation of the motor induces rotation of the agitator by magnetic coupling.

This "magnetic coupling" approach, however, is expensive and allows only limited torque to be delivered to the agitator, and still requires that the bearings supporting the shaft be located in the hostile environment of the vessel. As a result, it too may require that the bearings be made of special, expensive materials, may result in premature bearing failure, and may produce contamination of the vessel. Moreover, because the coupling force is inversely proportional to the square of the wall thickness between the magnets, there will be a practical limit to the level of coupling that can occur through a wall that is thick enough to maintain the integrity of the vessel. Furthermore, as torque requirements increase, the magnets may need to be placed further from the shafts so that the container through which the magnets operate must get larger, and its wall thickness must increase to contain the vessel pressure. As a result, practical torque and size limitations constrain the general applicability of magnetically coupled drives.

Accordingly, there is a need for an agitator drive system that can provide reliable operation to vessels that house severe conditions with little or no risk of pressure loss or of contaminating the contents of the vessel. In addition, there is a need to provide such a drive in a sealless system that can use conventional materials and parts. Furthermore, there is a need to provide a motor for such a drive that can operate reliably in a high-pressure atmosphere in which the pressure varies over time.

SUMMARY

In general, an agitator drive is disclosed for use with a chemical processing vessel. The drive may be sealed with the vessel, and may thus be under the same or similar pressure as the housing. The drive may be separated from the housing by an insulated floor, so that the temperature inside the housing is significantly lower than that inside the vessel. A pair of overlapping shields, in the form of a standpipe attached to the drive floor and a skirt attached to the shaft, may prevent fluid from the housing from entering the vessel. In addition, the bearings that hold the shaft may be immersed in one or more sumps around the shaft that are filled with lubricant. As a result, the drive shaft does not pass from a high-pressure area to a low-pressure area, and the active drive components, such as the bearings and motor, are isolated from the high temperatures in the vessel.

In one embodiment, a drive for an agitator assembly has a drive housing that defines an interior volume and a drive motor mounted in the interior volume. A bearing support is connected to the inside of the housing and has a bearing receptacle in which one or more bearings are mounted. A drive shaft surrounded by a sump is rotatably mounted in the bearings and is driven by the drive motor. The sump defines an inner volume for holding a lubricant in which at least a portion of the bearings are located in the inner volume so that the bearings may be immersed in the lubricant. The sump may also be connected to the drive shaft and rotate with the drive shaft.

The bearing support may have an upper portion, which may comprise a plurality of support arms or a solid disc, outside the sump, and a cantilevered portion, which may comprise a solid cylinder, that contains the bearing receptacle. The shaft, one or more bearings, and cantilevered portion may define a fluid galley, and the bearing support may have a fluid supply manifold. A floor may be located below the sump and may have a passage surrounded by a standpipe through which the drive shaft passes. A skirt attached to the shaft may surround and overlap with the standpipe, and may be provided with a baffle that overlaps with a baffle on the standpipe. A fluid circulation system may also receive and recirculate fluid from the motor and the bearings.

In another embodiment, a drive is provided having a housing with a floor, and a drive motor in the housing connected to a drive shaft that extends through the floor. A standpipe around the drive shaft may extend upward from the floor, and a shield may be attached to the drive shaft above the standpipe to prevent fluid from entering the standpipe. The shield may comprise a skirt that overhangs the standpipe, and the skirt may have a baffle that overlaps a baffle on the standpipe. A drain port may be located in the housing near the floor. A sump may be mounted around the shaft, and may have a bearing mounted in its interior volume. The sump's top edge may be above the top of the bearings, and the bearings may be cantilevered into the sump on a bearing support, which may have fluid passages for introducing lubricant near the bearings. The drive may also be provided with a media introduction line that extends through the standpipe and terminates near the shaft. Furthermore, the floor and a portion of the shaft that extends into the vessel below the floor may be insulated.

In yet another embodiment, a method of extending bearing life in an agitator drive is disclosed by which one or more bearings in a bearing support are provided around a drive shaft, a sump is provided around the bearings, lubricant is passed through the bearings until the sump is overflowing to lubricate and cool the bearings, and the fluid is recirculated. A divider, such as a floor, may be provided below the sump between the vessel and the drive around the drive shaft. Also, a standpipe may be provided around a hole in the divider to prevent fluid from passing into the vessel, and the fluid may be cooled outside the agitator drive.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
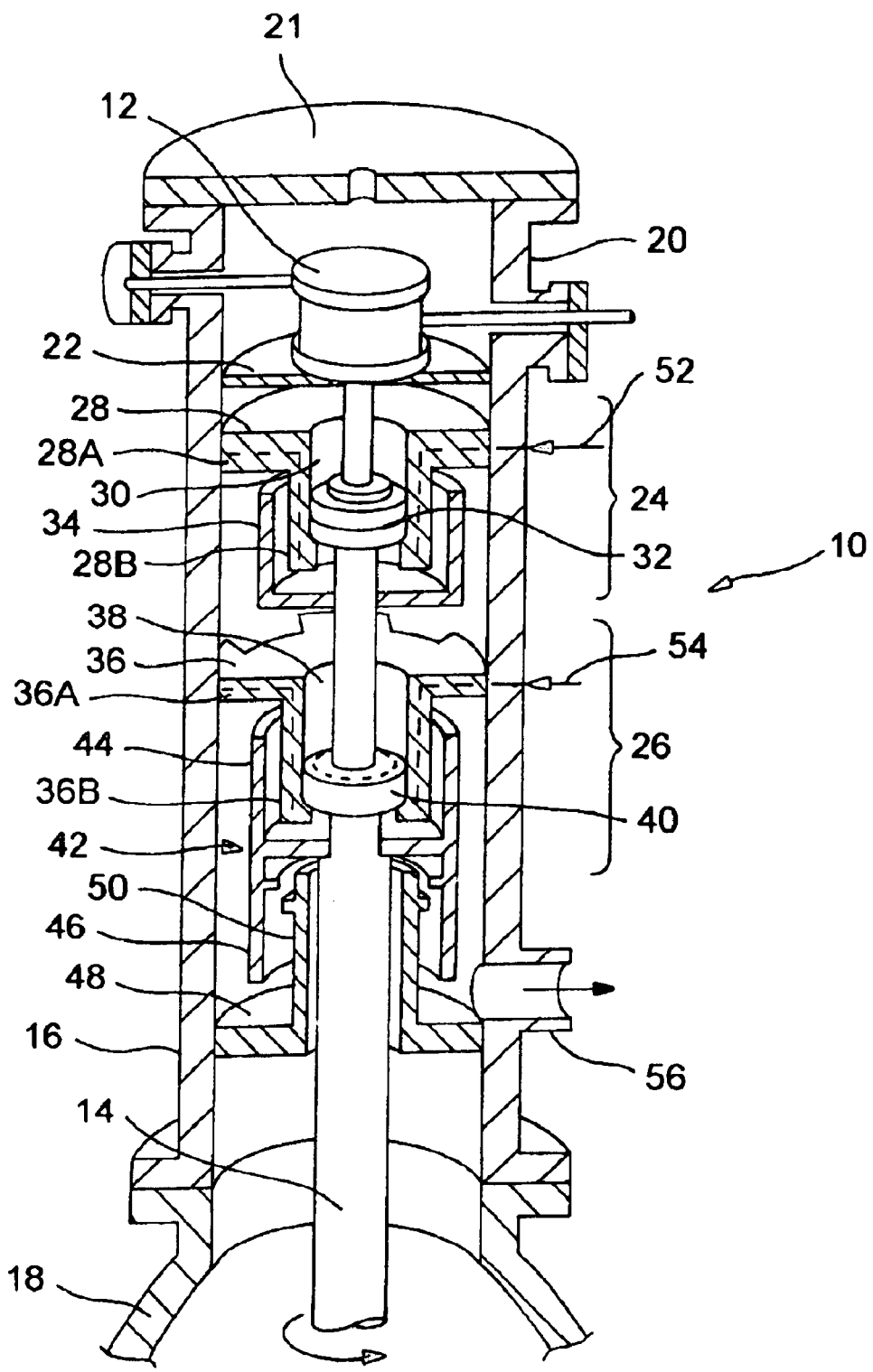
FIG. 1 is a partial section perspective view of a drive for use with an agitator.

FIG. 1 is a partial-section perspective view of a drive 10 for use with an agitator. Motor 12 is coupled to shaft 14, which extends down from motor 12 into reactor vessel 18, and provides the power for drive 10. Shaft 14 may be connected to an agitator (not shown) for stirring a liquid within vessel 18. The components of drive 10 may be located inside housing 16, which may extend outward from vessel 18, as shown, or may be partially or wholly located inside vessel 18. Vessel 18 may be a long-term storage vessel, a holding vessel that is intermediate to other process steps, a reactor vessel, or other pressurizable vessel useful in chemical or other process industries.

As shown, housing 16 is a hollow, pressure-tight cylinder whose inner walls support the various components of drive 10, but a variety of forms or arrangements could be used for housing 16. The interiors of housing 16 and vessel 18 are generally both held at a substantially similar and high pressure, such as several hundred psig. The interior of vessel 18 may be kept at several hundred degrees Fahrenheit, but the interior of housing 16 is generally kept at a substantially lower temperature. The interiors of vessel 18 and housing 16 may also be in communication, and any gases within housing 16 and vessel 18 may be allowed to intermingle. Alternatively, the pressure inside housing 16 may be kept slightly above the pressure inside vessel 18 so that gases inside vessel 18 are maintained inside vessel 18, or their release and exit from vessel 18 via housing 16 can be controlled, for example, by lowering the pressure of housing 16 below that of vessel 18. Likewise, gases may be introduced into housing 16 and may be moved into vessel 18.

Motor 12 may be located inside housing 16, and may be accessed via removable cover 21. Motor 12 may be a positive displacement type, hydraulically driven motor. Alternatively, motor 12 could be any type of power source that can provide rotational motion to shaft 14, such as electric or pneumatic motors. Cover 21 is advantageously provided so as to allow for the assembly, service, and at least partial disassembly of drive 10. In addition, portions of drive 10 may be provided in separate housing sections to permit for pre-assembly of the major elements of drive 10, and their subsequent attachment to the housing.

Mounting plate 22 may be fastened to housing 16 beneath motor 12, and may provide a convenient anchor for motor 12. Mounting plate 22 may be a solid plate, and could also be perforated to allow any lubricant that accumulates inside motor housing 20 to pass through to housing 16. In addition, mounting plate 22 may be removably mounted so as to allow easy access to other components within housing 16. Alternatively, motor 12 could be mounted by any of a number of other mounting means, such as cross-bars or mounting arms.

Shaft 14 can be held in place by one or more bearing assemblies 24, 26. Bearing assembly 24 includes a pair of bearings 32, a bearing support 28, and a sump 34. Bearing support 28 has an upper portion 28A that extends inward from the wall of housing 16, and a cylindrical descending cantilevered portion 28B. Upper portion 28A may be attached directly to the inner wall of housing 16, or may be attached to mounting blocks (not shown) that are attached to the inner wall of housing 16, so as to allow for easy removal of bearing support 28. Upper portion 28A may include a plurality of spiders, or arms, that extend from cantilevered portion 28B to the wall of housing 16. The spiders may be in the form of extending tabs that are formed integrally with upper portion 28A or may be separate structures. The spiders may create a gap between the inner wall of housing 16 and upper portion 28A so that lubricant may fall past bearing support 28, and so that access may be had to the lower bearing assembly 26. Alternatively, upper portion 28A could be a solid plate or disk.

Cantilevered portion 28B is cylindrically shaped and defines an inner volume appropriately sized to hold bearings 32. Moreover, cantilevered portion 28B may have a slight recessed portion sized to receive bearings 32 and hold them tightly in place. Cantilevered portion 28B could also take on a variety of other appropriate forms.

Bearings 32 are held in position inside cantilevered portion 28B, and form the bottom of oil galley 30. Bearings 32 may be lubricated with oil from lubricating line 52, either directly or by passage of lubricant into oil galley 30. For example, oil may be pumped through lubricating line 52 and may enter oil galley 30 at one or more locations via fluid passages (shown by dashed lines). The lubricant may then flow downward through bearings 32 either from pressure from lubricating line 52 or under the force of gravity. The lubricant may also be directed toward bearings 32 by any other suitable means, such as by introducing lubricant above bearing support 28. Preferably, the lubricant is introduced in sufficient quantities, and in a continuous or semi-continuous manner, to immerse bearings 32 and provide adequate flow over bearings 32 to afford them with fresh lubrication and cooling, and to ensure that bearings 32 do not seize or overheat during normal operation.

Sump 34 surrounds a portion of cantilevered portion 28B, and catches lubricant that passes from oil galley 30 through bearings 32. Sump 34 may be solidly attached to shaft 14 with a liquid-tight seal and may thus rotate as shaft 14 rotates. Sump 34 may be positioned so that its top lip is above the top of bearings 32 but below upper portion 28A. In this manner, bearings 32 will be fully immersed in lubricant, and oil galley 30 will not generally overflow onto the top of upper portion 28A. Alternatively, sump 34 could surround shaft 14, and not be attached to shaft 14, and therefore could be stationary. In such an arrangement, some lubricant may be allowed to pass between the inside portion of sump 34 and shaft 14.

A second bearing assembly 26 includes a single bearing 40, along with a bearing support 36 and sump 42. Such a second bearing assembly 26 may be particularly advantageous where shaft 14 is expected to be subjected to very high torques and/or transverse loads. Bearing assembly 26 may provide a second anchoring point that is separated from the anchoring point from bearing assembly 24, and may thereby achieve greater leverage in holding shaft 14 in place.

As with bearing assembly 24, the bearing support 36 for bearing assembly 26 has an upper portion 36A that extends inward from the wall of housing 16, and a cantilevered portion 36B. Lubricant may enter via passages (shown by dashed lines) in bearing support 36 through lubricating line 54, and may pass into oil galley 38 defined by cantilevered portion 36B and bearing 40. While the bearing supports 28, 36 are shown as having cylindrical portions for holding the bearings 32, 40, the bearing supports could also take on any of a number of other appropriate forms, such as a perforated basket, multiple support arms, or a ring hung from support arms.

Sump 42 may be provided to catch lubricant that flows through bearing 40. Sump 42 may be solidly attached by a liquid-tight seal to shaft 14 and may thus rotate with shaft 14. Sump 42 may have both an upper cup 44 and a descending skirt 46, wherein the upper cup 44 catches and holds lubricant while the skirt 46 provides a shield from the passage of lubricant. Sump 42 may be positioned so that the top lip of upper cup 44 is above the top of bearing 40 but below upper portion 36A of bearing support 36. In this manner, bearing 40 will be fully immersed in lubricant, and oil galley 38 will not generally overflow onto the top of upper portion 36A of bearing support 36. Sump 42 may also be provided separately of the descending skirt.

Descending skirt 46 may take a cylindrical shape and may descend downward toward, and terminate above, drive floor 48. A divider between the interior of housing 16 and the interior of vessel 18, in the form of drive floor 48, may be located at or near the bottom of housing 16, or may be located above or below the bottom of housing 16. Standpipe 50 may in turn take a cylindrical shape, co-axial with, and inside of, skirt 46, and may rise from drive floor 48. Standpipe 50 may overlap vertically with skirt 46 so as to impede or prevent the passage of liquid from vessel 18 into housing 16 and vice-versa. Standpipe 50 may also take any number of other appropriate forms that prevent fluids from passing from housing 16 into vessel 18. As a result, sump 42 may serve as a shield to prevent fluid from entering standpipe 50.

Drive floor 48, standpipe 50, and skirt 46 conveniently separate the interior of drive housing 16 from the interior of vessel 18. A serpentine path is created between standpipe 50 and skirt 46 so that liquid cannot easily pass between vessel 18 and housing 16. However, it is possible to allow gases to pass between the two areas, so that the pressure differential between vessel 18 and housing 16 is minimal, e.g., one atmosphere.

In general, no seal is required between shaft 14 and standpipe 50. Rather, standpipe 50 and skirt 46 block the passage of lubricating fluid out of drive housing 16 or the passage of chemical into drive housing 16. As a result, a sealless agitator drive may be achieved. Nonetheless, the present invention is not limited to sealless drives. In particular, seals or packing (such as graphite packing material) or restriction bushings (such as labyrinth bushings) may still be provided around shaft 14, for example, to maintain a pressure differential or to reduce heat flow from vessel 18. It should be recognized, however, that use of such sealing techniques is not necessary to practice the present invention, and that the disclosed embodiment can encompass both sealed and sealless designs.

The lubricant provided to drive 10 may be any appropriate lubricating and/or cooling fluid that provides a lubricating effect to bearings 32, 40, and may be a single fluid or a mixture of fluids. Examples of such fluids include hydraulic fluid, mineral oil, petroleum oil, and synthetic cooling or lubricating preparations, or water or water-based fluids. Hydraulic fluids offer the advantage of wide availability and good lubricating and cooling properties. Advantageously, the same fluid may be used for lubrication of bearings 32, 40 and for powering motor 12.

Figure 2:
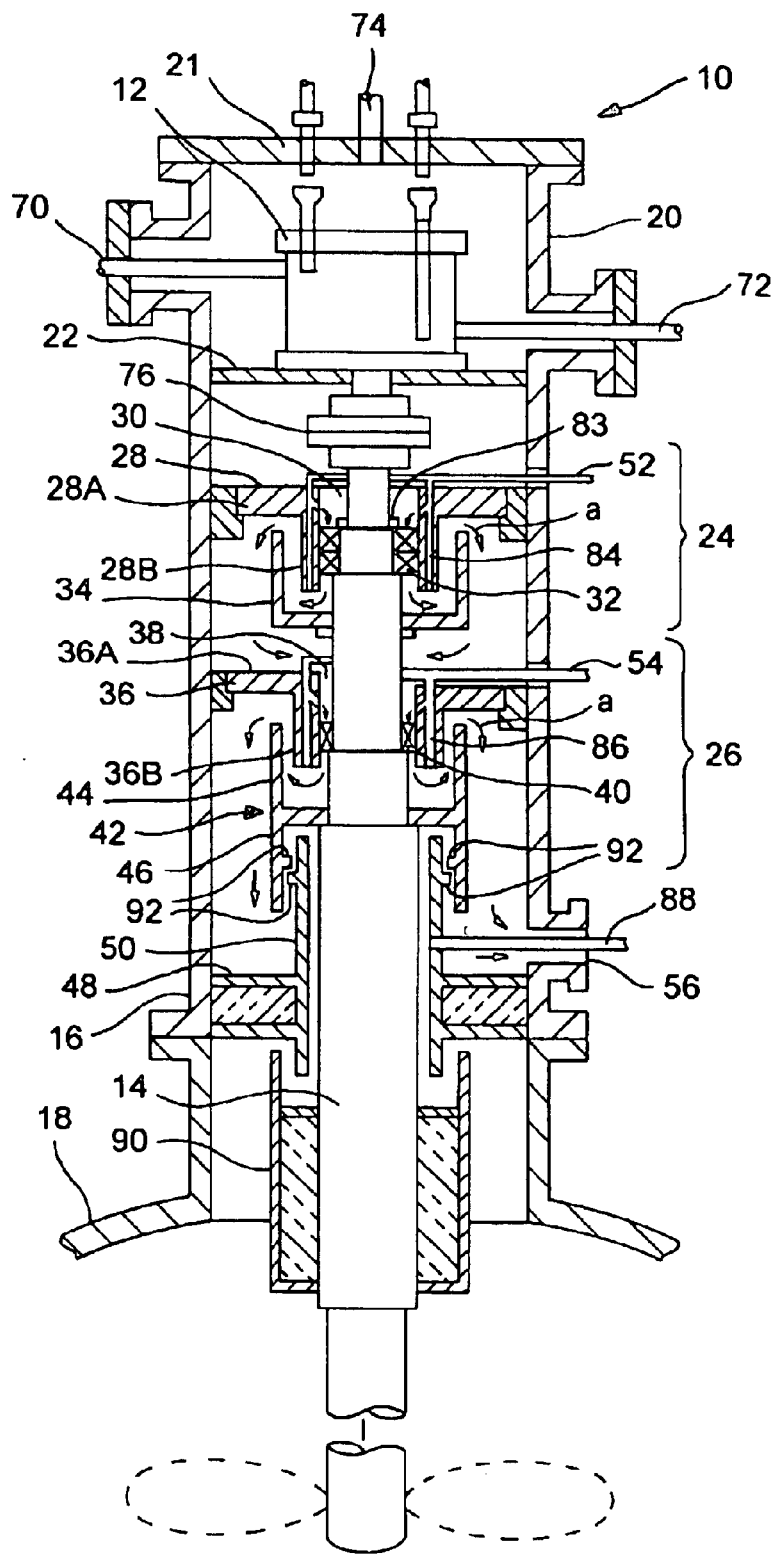
FIG. 2 is a cross-sectional view of the drive.

FIG. 2 shows drive 10 in cross-section. Motor 12 and shaft 14 are mounted inside housing 16. Hydraulic fluid for powering motor 12 is provide by supply line 70 and removed by return line 72. Because motor 12 is a positive displacement type motor, its rotational velocity may be conveniently controlled—and may be reversed—through the provision of fluid to the motor 12. Fluid that leaks from motor 12 may collect on plate 22, and may pass downward through holes in plate 22. In addition, excess pressure in housing 16 may pass up through holes in plate 22 and may be relieved via vent line 74, which opens into the top of housing 16.

Motor 12 is coupled to shaft 14 via coupling 76. Coupling 76 may allow for easier alignment of motor 12 with shaft 14, and may provide for easy removal of motor 12 from housing 16. Coupling 12 may take a variety of well-known forms, and may be solid or flexible.

As in FIG. 1, two bearing assemblies 24, 26, are shown, and each has a sump 34, 42. Lubricant supply line 52 may provide lubricant to bearing support 28, and lubricant supply line 54 may provide lubricant to bearing support 36. Lubricant lines 52, 54 may communicate with fluid supply manifolds 84, 86 in bearing supports 28, 36 respectively. As shown, lubricant is supplied both above bearings 32, 40 into oil galleys 30, 38, and below bearings 32, 40 into sumps 34, 42.

Sumps 34, 42 are positioned relative to bearings 32, 40 such that the upper lip of each cup is above the corresponding bearing or bearings. In this manner, adequate lubricant may be maintained around and over the bearings 32, 40 in the oil galleys 30, 38, so that the bearings 32, 40 are fully immersed. The lower sump 42 may, in one instance, be made deeper than the upper sump 34 so that the lower sump 42 holds a greater volume of lubricant, which thereby provides greater cooling to the lower, hottest portion of shaft 14.

Specifically, bearings 32 are depicted as a pair of bearings, and may be a pair of ball bearings, such as angular contact ball bearings mounted front-to-front or back-to-back to be resistant to thrust forces in both directions. Alternatively, two spaced apart tapered roller bearings mounted in opposite orientations could also be used. Other types of bearings, including tapered roller bearings, needle bearings, ball thrust bearings, and sleeve or journaled bearings may also be used in appropriate circumstances. Moreover a single bearing or various combinations of bearings, including bearings such as magnetic levitation bearings, may also be used. Also, bearings 32 could be mounted to provide resistance to thrust forces in only one direction. A retainer 83 may be provided on shaft 14 to hold bearings 32 in place, and may take the form of a threaded collar, a threaded nut, a friction-fit collar, a locking pin or ring, or other appropriate structure. Likewise, bearing 40 may be any appropriate bearing or combination of bearings.

Drive floor 48 generally acts to collect lubricant that spills over from rotating sump 42. Drive floor 48 is shown with insulation that slows the transfer of heat from inside vessel 18 to inside housing 16. In addition, a drain line 56 is provided near drive floor 48 to allow for the exit of lubricant from housing 16. Drain line 56 may be conveniently oversized so that lubricant flows easily out of housing 16. In addition, a weir may be provided to ensure that some lubricant remains on the drive floor 48 and to provide additional insulation between vessel 18 and housing 16. Moreover, drive floor 48 may be provided with internal channels (not shown) for the passage of cooling fluid so as to further insulate housing 16 from vessel 18. While drive floor is shown at the interface between housing 16 and vessel 18, it may also be located further inward of housing 16.

Standpipe 50 may extend upward and downward from drive floor 48, and may be concentric with, and in close proximity to, shaft 14. Insulating sheath 90 may be provided around shaft 14 inside vessel 18, and may further slow the transfer of heat from vessel 18 into shaft 14 and housing 16. An upper lip of sheath 90 may extend upward, and may overlap with the descending portion of standpipe 50 to form a debris well, to reduce the likelihood of contamination, and to block the flow of heat upward. Furthermore, fluid baffles 92 may be provided peripherally on the outside of standpipe 50 and the inside of skirt 46 to also block the flow of lubricant out of housing 16. Shown in the figure in plate-like form, baffles 92 may take any other appropriate form, including forms that establish a non-pressure-tight, but serpentine, passage.

As noted, a number of features help to block heat flow from vessel 18 into housing 16. Insulated sheath 90 prevents direct flow into the body of shaft, and the sheath's upwardly projecting portion helps block the convective flow of heat. Drive floor 48 may be insulated and further block the flow of heat upward from vessel 18. In addition, lubricant on drive floor 48 may further absorb heat just before the fluid exits via port 56. Standpipe 50 may also block convective heat flow, both by its close proximity to shaft 14 and its overlapping with skirt 46 (and via their overlapping baffles 92). Moreover, lubricant in rotating sumps 34, 42 and in oil galleys 30, 38 may be in contact with shaft 14 and may thereby remove additional heat that is able to propagate upward through shaft 14.

In operation, motor 12 provides a rotary force to shaft 14. Lubricant is provided via lines 52, 54 and flows into oil galleys 30, 38 and rotating sumps 34, 42. Lubricant may alternatively be provided by other suitable means, including entry through the walls of housing 16 and across the top of bearing supports 28, 36. Lubricant from oil galleys 30, 38 flows downward under the force of the supply pump or gravity through bearings 32, 40 and into sumps 34, 42. When lubricant in oil galleys 30, 38 rises above the level of the upper lips of sumps 34, 42, respectively, lubricant is forced to overflow sumps 34, 42. Where bearings 32, 40 are lower, respectively, than the upper lips of sumps 34, 42, bearings 32, 40, will be immersed in lubricant. In this manner, the height of the upper lips can be used to control the depth of the lubricant in sumps 34, 42. The upper portion 36A of bearing support 36 may be comprised of a plurality of arms that extend inward from the wall of housing 20 toward cantilevered portion 36B, so that lubricant that overflows sump 34 may fall through the arms and onto drive floor 48. In the case of rotating sump 42, overflowing lubricant falls directly to drive floor 48. Fluid on drive floor 48 may exit through drain port 56. The general flow of lubricant is indicated in the figure via small arrows marked 'a.'

Media, such as gases, liquids, or powders, may be introduced into the system via media introduction line 88. As shown, media introduction line 88 enters housing 16 through the center of drain port 56, and opens in the wall of standpipe 50 near shaft 14. In this manner, introduced gases may migrate down along the shaft 14 into vessel 18 and up along shaft 14 into housing 16. Such gases may be provided, for example, where the process vessel 18 requires a particular environment, or where the introduced gas reduces the entry of deleterious gases from the process into housing 16. The gases may include any gas used in the process vessel, or gases introduced to maintain a particular pressure differential between housing 16 and vessel 18, including air.

Advantageously, the pictured arrangement separates the bearings from the high temperature inside vessel 18. As a result, the arrangement can make use of conventional bearings, thereby lowering the costs and improving the reliability of the system. Also, the arrangement does not place the bearings or other components in between two areas of greatly differing pressure. Therefore, high-pressure seals or other precautions are generally not needed for the drive to operate. The pictured arrangement allows the bearings to be isolated from the high temperature inside vessel 18 without requiring a pressure-tight seal around shaft 14 that separates the inside of vessel 18 from the ambient atmosphere. Rather, the interior of housing 16 is generally kept at the same or a similar pressure to that inside vessel 18. By eliminating such a seal, the risk of contamination, early seal failure, and escaping gases or other materials can be greatly minimized.

Figure 3:
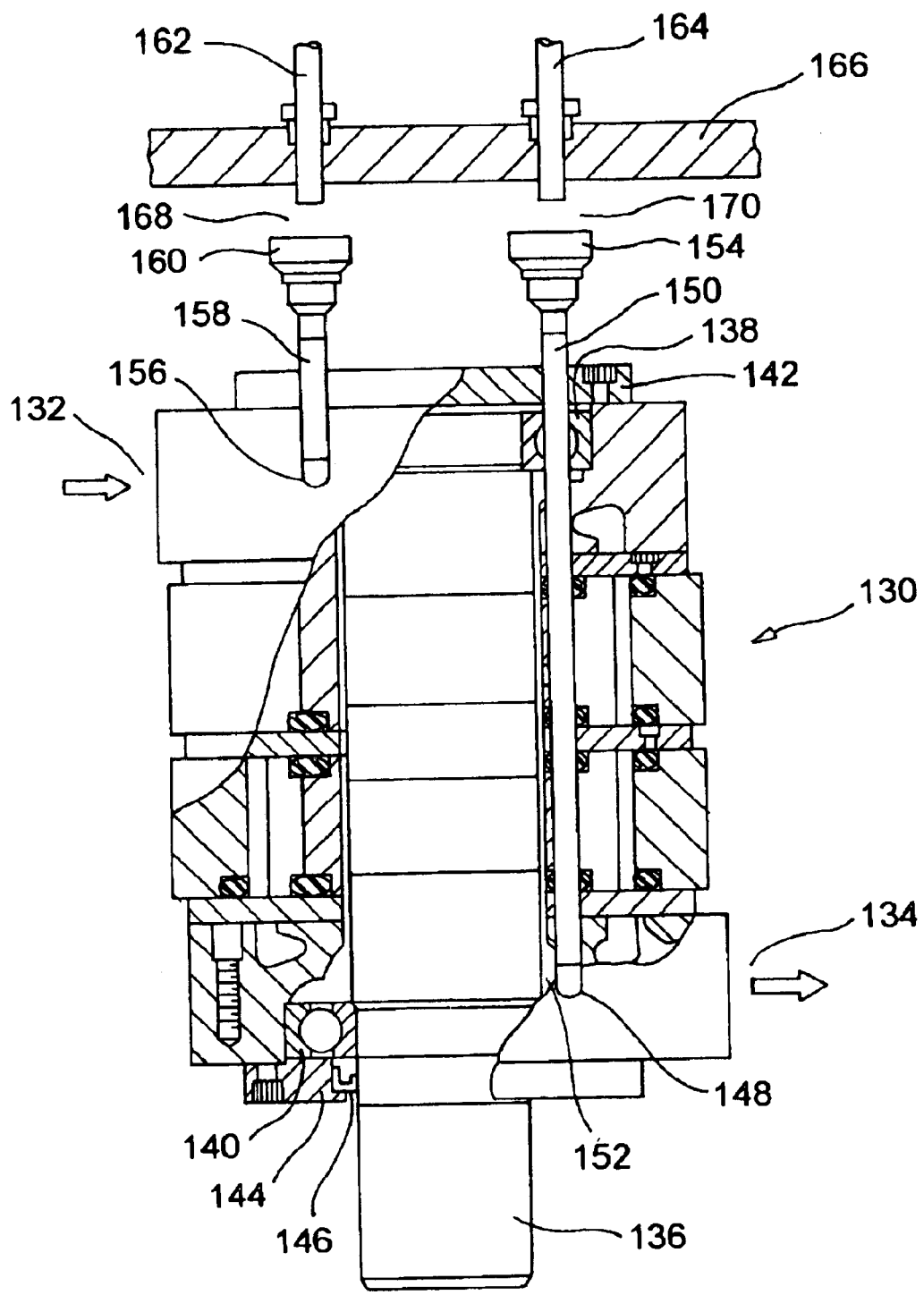
FIG. 3 shows a partial section view of a hydraulic drive motor for use in a high-pressure environment.

FIG. 3 shows a partial section view of a hydraulic drive motor 130 for use in a high-pressure environment. In particular, standard hydraulic motors are filled with hydraulic fluid that is under pressure. In normal use, the internal pressure in the motor generally pushes hydraulic fluid from inside the motor through bearings at the edge of the motor. In this manner, the motor bearings, which are usually located near the ends of a motor, may receive a continuous supply of fluid and may be lubricated by the fluid. The fluid may be caught at the edge of the motor and recycled, or it may be allowed to drip out of the motor into the ambient atmosphere. However, when a standard hydraulic motor is placed in a high-pressure atmosphere, where the ambient pressure is higher than the fluid pressure inside the motor, the hydraulic fluid is not able to flow out of the center of the motor and lubricate the bearings. As a result, the bearings may be starved of lubricant, may be exposed to corrosive gases, and may wear out quickly.

Hydraulic motors may be provided with drain holes that open into internal cavities near the motor bearings. Therefore, in a high-pressure environment, it is possible to pipe lubricant through the drain holes at sufficient pressure so that the lubricant flows out and over the bearings. To ensure adequate and substantially continuous lubrication, however, it may be necessary to vary the pressure at which the fluid is introduced to compensate for changes in the ambient pressure around the motor. Such compensation may require the use of a closed-system control loop having pressure transducers and control valves-an expensive and complicated solution.

Motor 130 is adapted to operate without complex structures within a high-pressure environment in which the pressure may change over time. Motor 130 includes a hydraulic fluid inlet 132 and a hydraulic fluid outlet 134. Hydraulic fluid enters inlet 132 under pressure and leaves through outlet 134. The hydraulic fluid passing through motor 130 may provide a force to cause motor shaft 136 to rotate. Motor shaft 136 may be connected to an agitator, such as that described above, or to other equipment.

Motor shaft 136 may be held in place by upper bearing 138 and lower bearing 140, which may be ball bearings or any other appropriate type of bearing. Bearings 138, 140 may be removable, and may be held in place by upper bearing retainer 142 and lower bearing retainer 144, respectively. A lip seal 146 may be provided to catch fluid that has passed through lower bearing 140. Lip seal 146 may be provided with a drain so that fluid that collects there may be passed to another location and recycled.

Lower case drain 148 can provide access to a lower cavity 152 behind lower bearing 140 and may thereby allow ingress and egress of fluid from lower cavity 152. Likewise, upper case drain 156 may allow access to an upper cavity (not shown) behind upper bearing 138. Fluid conduits 150, 158 may connect, respectively, to lower case drain 148 and upper case drain 156, so that fluid in the conduits may flow into motor 130. Conduits 150, 158 may terminate, respectively, at fluid receptacles 154, 160. Fluid supply conduits 164, 162 can extend through a wall 166 of a pressurized housing and terminate above fluid receptacles 154, 160, separated from fluid receptacles 154, 160, by air gaps 170, 168. Fluid receptacles 154, 160 could also be combined into a single receptacle, and fluid supply conduits 164, 162 could also be combined with each other.

In operation, lubricant may be introduced through fluid supply conduits 162, 164 and may pass into fluid receptacles 154, 160. Fluid receptacles 154, 160 may be cup-shaped and sized so as to catch a substantial portion of the lubricant from fluid supply conduits 164, 162. The lubricant held in fluid receptacles 154, 160 may supply a slight head of pressure that pushes lubricant down through conduits 150, 158 and into motor 130 so that the lubricant may pass over bearings 140, 138. Advantageously, the pressure of the fluid in fluid receptacles 154, 160 is always referenced to the ambient pressure around motor 130, so that if the ambient pressure changes, the lubricant will still flow into motor 130.

Lubricant may be introduced through fluid supply conduits 162, 164 at a relatively steady rate or a varying rate. Fluid may be supplied at a relatively steady rate, for example, where the fluid is driven by a constant velocity positive displacement pump. To the extent the lubricant flow exceeds the demands of the motor, the lubricant may be allowed to overflow fluid receptacles 154, 160, and may be collected, filtered, and recycled. Where it is not possible to have the fluid overflow fluid receptacles 154, 160, the flow rate through fluid supply conduits 162, 164 may be varied or stopped. For example, the amount of fluid supplied may be decreased as the hydraulic motor speed is decreased. Alternatively, fluid level sensors (not shown), such as floats, may be provided in receptacles 154, 160 so as to turn off the supply of fluid before the fluid overflows.

Alternatively, an air gap may be provided at one or both of the case drains 148, 156. Lubricant may, in that instance, be sprayed or misted across the gap and into the motor, so that case drains 148, 156, act as fluid receptacles.

Advantageously, the disclosed embodiment provides for a motor that can be operated in a high-pressure environment without the need for specialized pressure compensation mechanisms. The reservoir of fluid is constantly referenced to the pressure around motor 130, so that the pressure of the fluid behind bearings 138, 140 is slightly higher than the pressure in front of bearings 138, 140. In this manner, bearings 138, 140 may be provided with an appropriate level of lubricant throughout the operation of motor 130.

Figure 4:
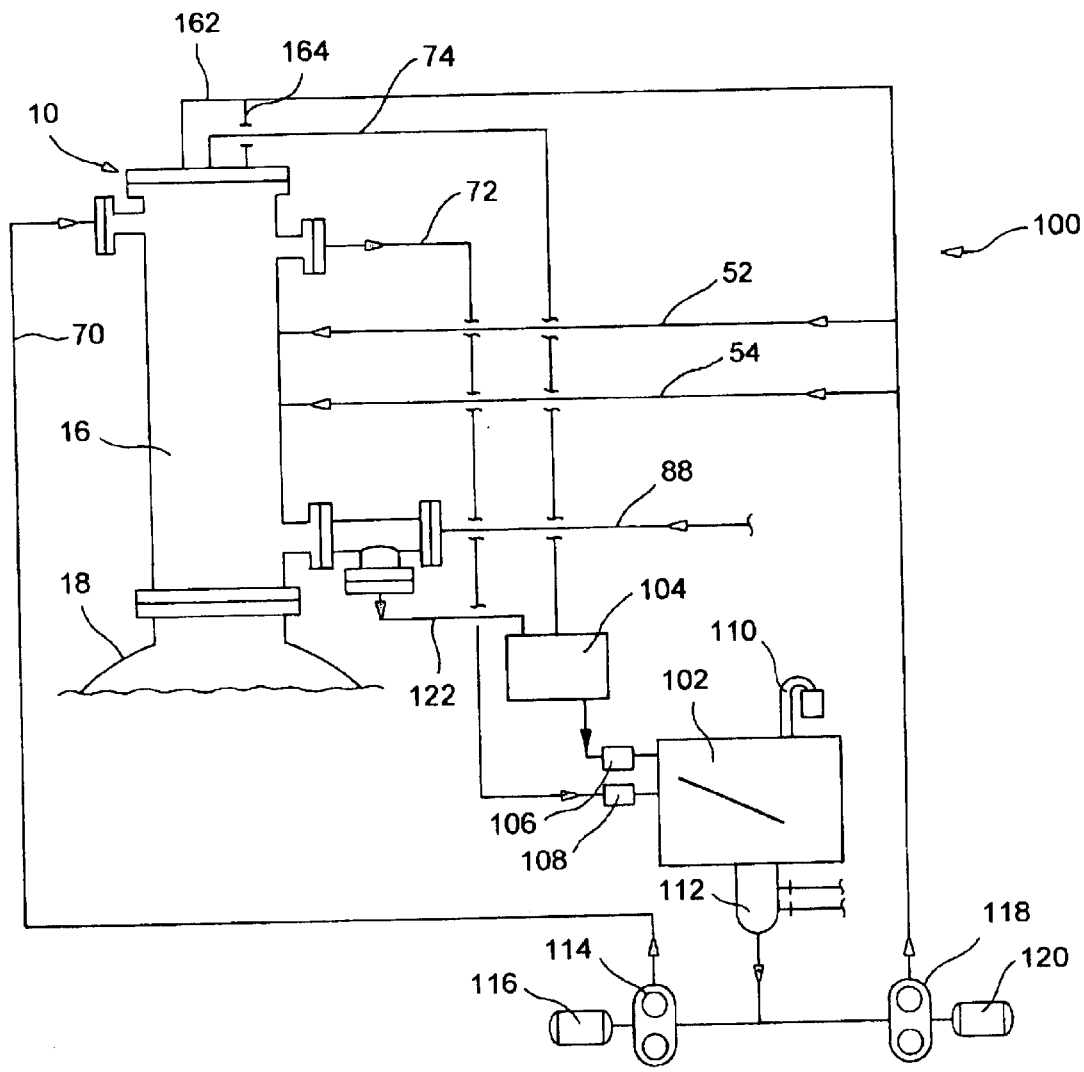
FIG. 4 shows the fluid circulation system for the drive system in schematic form.

FIG. 4 illustrates, in schematic form, a fluid circulation system 100 for drive 10. The circulation system 100 may be a generally closed system, and may provide both power for operating drive 10, and lubrication and cooling for the bearings and other components inside drive 10. Advantageously, both functions may be performed with the same fluid. In addition, system 100 may provide for the capture, filtering, and reuse of fluid from drive 10, and may control any gases inside drive 10.

The pressure inside housing 16 may be maintained in part via trap 104 attached to vent line 74 and drain line 122. Drain line 122 may be adequately sized so that it is not entirely filled with lubricant leaving housing 16, and may thereby allow gas to escape. Drain line 122 may also be sized to be completely filled with lubricant.

Trap 104 may act as a liquid/gas separator, and hydraulic fluid storage tank 102 may release any remaining gases through vent 110. For example, vent 110 may bleed off undesired gases, or such gases may be released to atmosphere, and may be ignited from a flare on vent 110. Such gases could also be reclaimed and stored for later use, collection, or disposal, or for processing, as appropriate. To capture gas and fluids, vent line 74 connects to trap 104, which in turn empties into storage tank 102. Trap 104 may receive lubricant that has passed through drive 10 from drain line 122, and may likewise pass the lubricant to storage tank 102. Lubricant that has been used to power the drive 10 also passes from return line 72 to storage tank 102. Catch filters 106, 108 may be provided in the lines leading to storage tank 102 to remove debris that enters the lubricant in drive 10.

Lubricant in storage tank 102 may be withdrawn for powering the motor in drive 10 and for lubricating and cooling components in drive 10, such as bearings. As shown, a shell-and-tube heat exchanger 112 is provided to remove heat that has accumulated in the lubricant from drive 10. The cooling fluid for heat exchanger 112 may be, for example, water from a cooling tower or another source of available relatively cool fluid. Other types of heat exchangers may also be used. In addition, heat exchanger 112 may be provided in the returns that are upstream from storage tank 102.

Positive displacement pumps 114, 118 may be provided for supplying lubricant, respectively, for powering the motor in drive 10, and for lubricating and cooling bearings in drive 10. Pump 114 is a positive displacement gear-type pump, and is powered by drive 116. Pump 114 draws fluid from storage tank 102 and provides the fluid via supply line 70 to the motor in drive 10. Drive 116 may be a variable speed drive. Because the motor in drive 10 is a positive displacement motor, and pump 114 is a positive displacement pump, the rotational speed of the motor may be controlled by the speed of drive 116. Other types of pumps, including non-positive displacement pumps, may also be used.

Pump 118 is also a positive displacement gear-type pump, and may be coupled to drive 120. Pump 118 may draw fluid from storage tank 102 and provide the fluid under pressure as lubricant for bearings and other components in drive 10. The lubricant may be supplied to the bearings via lines 52, 54. Lubricant may also be supplied via lines 162, 164 to lubricate motor bearings in drive 10. In addition, media introduction line 88 may provide a medium, such as a gas stream, to the interior of housing 16, as discussed above.

Advantageously, the disclosed system separates the drive bearings and other drive components from the heat of the vessel and also collects lubricant from the bearings so that low-cost conventional bearings may be used. For example, open-type bearings, i.e., those that are not sealed, allow for the flow of lubricating fluid throughout the various parts of the bearings, such as the rollers, balls, needles, or other intermediate members that may be positioned between the bearing races. In addition, because there are no substantial pressure differences across the bearings, the bearings need not be selected to maintain a pressure, and may have longer service lives.

In addition, the same fluid may provide power, lubrication, and cooling. As a result, fewer parts are needed for the drive system, and the system can thereby be built and operated more reliable and less expensively. Of course, other fluid supply and circulation systems having different arrangements of components other than that shown in the Figures can also be used and provide a similar function.

Other arrangements of the disclosed embodiment are also within the scope of the invention. For example, various numbers, types, and arrangements of bearings may be provided to hold the shaft, and additional bearings would provide for a more even distribution of the load from the shaft and improved cooling of each bearing. In addition, a "tandem" system, in which two (or more) shafts are provided inside a single housing, can be provided, in which each shaft would be provided with one or more bearings and associated rotating sumps, and could be driven by a single motor or multiple motors. Such an arrangement would be particularly advantageous for a process requiring two or more agitators in one vessel, particularly where the agitators are counter-rotating.

It should be understood that various modifications could be made without departing from the spirit and scope of the invention. In particular, the invention is intended to be operable in any of a number of environments, and using any of a number of arrangements of elements. Accordingly, other implementations are within the scope and coverage of the following claims.

What is claimed is:

1. A drive for an agitator assembly, comprising:
   a drive housing defining an interior volume;
   a drive motor mounted in the interior volume of the drive housing;
   a bearing support connected to the inside of the housing and having a bearing receptacle;
   one or more bearings mounted in the bearing receptacle;
   a drive shaft rotatably mounted in the one or more bearings and driven by the drive motor;
   a sump surrounding the drive shaft, the sump defining an inner volume for holding a lubricant, and wherein at least a portion of the one or more bearings are mounted in the inner volume of the sump so that the bearings may be immersed in lubricant in the sump.

2. The drive of claim 1, wherein the sump is connected to the drive shaft and rotates with the drive shaft.

3. The drive of claim 1, wherein the bearing support comprises an upper portion that is located outside the inner volume of the rotating sump and a cantilevered portion, and wherein the bearing receptacle is located in the cantilevered portion and is located at least partially in the inner volume of the rotating sump.

4. The drive of claim 3, wherein the upper portion of the bearing support comprises a plurality of support arms.

5. The drive of claim 3, wherein the upper portion of the bearing support comprises a solid disc.

6. The drive of claim 3, wherein the cantilevered portion of the bearing support comprises a hollow cylinder.

7. The drive of claim 6, wherein the shaft, one or more bearings, and cantilevered portion define a fluid galley.

8. The drive of claim 1, further comprising a fluid supply manifold in the bearing support.

9. The drive of claim 1, further comprising a floor below the sump, the floor having a passage through which the shaft extends.

10. The drive of claim 9, further comprising a standpipe extending upward from the floor and surrounding the passage so that lubricant on the floor does not enter the passage.

11. The drive of claim 10, further comprising a skirt attached to the shaft, and concentric with and overlapping the standpipe.

12. The drive of claim 11, wherein the skirt has an inner surface and an outer surface, and the standpipe has an inner surface and an outer surface, and further comprising a first baffle on the inner surface of the skirt and a second baffle on the outer surface of the standpipe that overlaps with the first baffle.

13. The drive of claim 1, wherein the drive motor is a hydraulic motor.

14. The drive of claim 13, further comprising a fluid circulation system that receives fluid from the drive motor and fluid that lubricates the bearing, and mixes and recirculates the fluids.

15. A drive for an agitator assembly, comprising:
   a drive housing having a floor, and that is attachable to a process vessel;
   a drive motor mounted within the drive housing;
   a drive shaft coupled to the drive motor and extending through an opening in the floor;
   a standpipe located above the opening and extending upward from the floor, and concentric with the drive shaft; and
   a shield attached to the drive shaft and located above the standpipe to prevent fluid from entering the standpipe.

16. The drive of claim 15, wherein the shield comprises a skirt positioned concentrically with the standpipe and overhanging the top of the standpipe.

17. The drive of claim 15, further comprising a drain port in the housing near the floor.

18. The drive of claim 15, wherein the skirt has an inner surface and an outer surface, and the standpipe has an inner surface and an outer surface, and further comprising a first baffle on the inner surface of the skirt and a second baffle on the outer surface of the standpipe that overlaps with the first baffle.

19. The drive of claim 15, further comprising a sump mounted concentrically around the shaft and defining an interior volume for holding fluid lubricant, and a bearing mounted on the shaft and positioned in the interior volume of the sump.

20. The drive of claim 19, wherein the sump has an upwardly extending wall having a top edge that is above the top level of the one or more bearings.

21. The drive of claim 20, wherein the sump is attached to the skirt.

22. The drive of claim 20, further comprising a bearing support that is at least partly cantilevered into the interior of the sump.

23. The drive of claim 20, wherein the bearing support comprises a cylinder that defines an interior volume, and the bearing is secured at least partially in the interior volume.

24. The drive of claim 23, further comprising one or more fluid passages in the bearing support for introducing lubricant in the vicinity of the bearing.

25. The drive of claim 15, further comprising a media introduction line that extends through the standpipe and terminates on the interior of the standpipe near the shaft.

26. The drive of claim 15, wherein the floor is insulated to slow the passage of heat from the vessel into the housing.

27. The drive of claim 26, wherein a portion of the shaft extends into the vessel below the drive floor, and wherein at least part of the shaft inside the vessel is insulated.

28. A method of extending bearing life in an agitator drive having a shaft that extends into a vessel, comprising:
   providing one or more bearings around the drive shaft in a bearing support;
   providing a rotating sump around the one or more bearings;
   passing lubricating fluid through the one or more bearings and into the rotating sump until the rotating sump is overflowing with lubricant, to lubricate and cool the bearings; and
   recirculating the lubricating fluid.

29. The method of claim 28, further comprising providing a separator below the rotating sump and around the drive shaft, between the vessel and at least a portion of the agitator drive.

30. The method of claim 29, further comprising providing a standpipe around the drive shaft at the separator to prevent lubricating fluid from passing into the vessel.

31. The method of claim 28, further comprising cooling the lubricating fluid outside the agitator drive.

* * * * *